(12) United States Patent
Florentin et al.

(10) Patent No.: US 7,620,483 B2
(45) Date of Patent: Nov. 17, 2009

(54) METHOD FOR GUIDING A REMOTE VEHICLE VIA LAGGED COMMUNICATION CHANNEL

(75) Inventors: Itzhak Florentin, D. N. Misgav (IL); Liat Berger, Haifa (IL); Amir Kalisman, D. N. Misgav (IL)

(73) Assignee: Rafael-Armament Development Authority Ltd., Haifa (IL)

( * ) Notice: Subject to any disclaimer, the term of this patent is extended or adjusted under 35 U.S.C. 154(b) by 760 days.

(21) Appl. No.: 10/499,799

(22) PCT Filed: Dec. 23, 2002

(86) PCT No.: PCT/IL02/01030

§ 371 (c)(1),
(2), (4) Date: Dec. 27, 2004

(87) PCT Pub. No.: WO03/060416

PCT Pub. Date: Jul. 24, 2003

(65) Prior Publication Data

US 2005/0119801 A1    Jun. 2, 2005

(30) Foreign Application Priority Data

Dec. 27, 2001   (IL) .................................. 147370

(51) Int. Cl.
*G05D 1/00* (2006.01)
*G05D 1/02* (2006.01)

(52) U.S. Cl. .................. 701/2; 701/25; 701/26; 701/28; 701/301; 700/245; 700/246; 700/247; 700/248; 700/258; 348/114; 348/118; 348/119; 318/587

(58) Field of Classification Search .............. 701/2, 701/25, 26, 28, 301, 23; 700/245, 246, 247, 700/248, 258; 318/587; 348/114, 118, 119, 348/E7.001, E7.046, E7.088, E7.092, 143, 348/581, 571, E5.062, E9.055, 630, 631, 348/663; 180/168; 901/1, 46, 47; 375/240.08, 375/240.12, 240.26; 386/46; 725/131; 726/26; 382/100, 107, 289; 455/421, 422, 427; 709/219
See application file for complete search history.

(56) References Cited

U.S. PATENT DOCUMENTS

| | | | |
|---|---|---|---|
| 4,162,775 A | | 7/1979 | Voles |
| 4,720,871 A | * | 1/1988 | Chambers .................... 382/278 |
| 4,855,822 A | * | 8/1989 | Narendra et al. ............ 348/114 |
| 4,926,346 A | * | 5/1990 | Yokoyama ................... 701/28 |
| 5,155,683 A | | 10/1992 | Rahim |
| 5,596,319 A | | 1/1997 | Spry |
| 5,680,313 A | * | 10/1997 | Whittaker et al. ........... 701/300 |
| 5,717,463 A | * | 2/1998 | Brailean et al. ......... 375/240.12 |
| 5,835,147 A | | 11/1998 | Florentin et al. |
| 5,907,626 A | * | 5/1999 | Toklu et al. ................. 382/107 |
| 6,061,055 A | | 5/2000 | Marks |
| 6,545,743 B1 | * | 4/2003 | Luo et al. ..................... 355/18 |
| 6,654,507 B2 | * | 11/2003 | Luo ............................ 382/282 |
| 7,116,830 B2 | * | 10/2006 | Srinivasan ................... 382/236 |
| 7,242,713 B2 | * | 7/2007 | Srinivasan et al. ...... 375/240.01 |

FOREIGN PATENT DOCUMENTS

| | | |
|---|---|---|
| EP | 0 606 173 | 7/1994 |
| EP | 0 606 173 A1 | 7/1994 |
| EP | 0 423 984 B1 | 6/1996 |
| WO | WO 00/46985 | 8/2000 |

OTHER PUBLICATIONS

Li et al., CCD-based system for three-dimensional real-time positioning, 1998, IEEE, p. 2503-2506.*

* cited by examiner

*Primary Examiner*—Khoi Tran
*Assistant Examiner*—Marc McDieunel
(74) *Attorney, Agent, or Firm*—Merchant & Gould P.C.

(57) ABSTRACT

The invention relates to a method for guiding from a remote control center a vehicle towards a target object, said remote control center communicating with the vehicle by means of a lagged communication channel, comprising:

At the vehicle: (a) Periodically capturing frame images by a camera, assigning to each of said captured frames an associated unique time stamp, and saving within a storage at the vehicle full frame data or partial frame data of captured frames and their associated time stamps; (b) For a plurality of saved frames, sending to the control center via the lagged communication channel full frame data, partial frame data or a combination thereof with the corresponding associated time stamp for each sent frame so that approximate or exact version of the sent frames can be reconstructed and displayed at the control center; At the control center: (c) Receiving said frame data and associated time stamps, sequentially reconstructing frame images from each said sent full and/or partial frame data, and displaying the reconstructed images on a display; (d) Upon marking by an operator at the control center a point on a specific displayed frame, sending coordinates indication relating to said marked point as appearing on said specific frame or on a reference frame available at the control center, and the time stamp associated with said specific or reference frame, as is the case, to the vehicle; At the vehicle: (e) Receiving said coordinates indication as marked and the sent frame time stamp; (f) Given the coordinates indication and frame time stamp as received, fast forward tracing said point or object coordinates from the said frame towards the most recently available captured frame, thereby finding the coordinates of the same point or object as appearing in the most recently available captured frame; and (g) Providing the coordinates of the target point or object within the most recently available captured frame, as found, to an inner guidance sub-system of the vehicle, for enabling it to track said object.

25 Claims, 10 Drawing Sheets

| TIME | CAMERA | COMPRESSION | GMP CALCULATION | TRANSMISSION | DECOMPRESSION+ GMP CALCULATION | DISPLAY |
|---|---|---|---|---|---|---|
| T1 | F1 | | | | | |
| T2 | F2 | F1 | | | | |
| T3 | F3 | | G2(F1,F2) | | | |
| T4 | F4 | | G3(F1,F3) | F1 | | |
| T5 | F5 | | G4(F1,F4) | G2,F1 | | |
| T6 | F6 | | G5(F1,F5) | G3,F1 | | |
| T7 | F7 | F6 | G6(F1,F6) | G4,F1 | | |
| T8 | F8 | | G7(F6,F7) | G5,F1 | *F1* | |
| T9 | F9 | | G8(F6,F8) | G6,F6 | *F2 = G2(F1)* | *F1* |
| T10 | F10 | | G9(F6,F9) | G7,F6 | *F3 = G3(F1)* | *F2* |
| T11 | F11 | | G10(F6,F10) | G8,F6 | *F4 = G4(F1)* | *F3* |
| T12 | F12 | F11 | G11(F6,F11) | G9,F6 | *F5 = G5(F1)* | *F4* |
| T13 | F13 | | G12(F11,F12) | G10,F6 | *F6* | *F5* |
| T14 | F14 | | G13(F11,F13) | G11,F11 | *F7 = G7(F6)* | *F6* |
| T15 | F15 | | G14(F11,F14) | G12,F11 | *F8 = G8(F6)* | *F7* |
| T16 | F16 | | G15(F11,F15) | G13,F11 | *F9 = G9(F6)* | *F8* |
| T17 | F17 | F16 | G16(F11,F16) | G14,F11 | *F10 = G10(F6)* | *F9* |
| T18 | F18 | | G17(F16,F17) | G15,F11 | *F11* | *F10* |
| T19 | F19 | | G18(F16,F18) | G16,F16 | *F12 = G12(F11)* | *F11* |
| T20 | F20 | | G19(F16,F19) | G17,F16 | *F13 = G13(F11)* | *F12* |

*Fig. 4a*

| TIME | CAMERA | COMPRESSION | GMP CALCULATION | TRANSMISSION | DECOMPRESSION + GMP CALCULATION | DISPLAY |
|---|---|---|---|---|---|---|
| T1 | F1 | | | | | |
| T2 | F2 | F1 | | | | |
| T3 | F3 | | G2(F1,F2) | F1 | | |
| T4 | F4 | | G3(F1,F3) | G2,F1 | | |
| T5 | F5 | | G4(F1,F4) | G3,F1 | | |
| T6 | F6 | | G5(F1,F5) | G4,F1 | | |
| T7 | F7 | F6 | G6(F1,F6) | G5,F1 | | |
| T8 | F8 | | G7(F6,F7) | G6,F6 | F1 | |
| T9 | F9 | | G8(F6,F8) | G7,F6 | F6=G6(F1) | F6 |
| T10 | F10 | | G9(F6,F9) | G8,F6 | F7=G7*G6(F1) | F7 |
| T11 | F11 | F11 | G10(F6,F10) | G9,F6 | F8=G8*G6(F1) | F8 |
| T12 | F12 | | G11(F6,F11) | G10,F6 | F9=G9*G6(F1) | F9 |
| T13 | F13 | | G12(F11,F12) | G11,F11 | F10=G10*G6(F1) And F6 | F10 |
| T14 | F14 | | G13(F11,F13) | G12,F11 | F11=G11(F6) | F11 |
| T15 | F15 | | G14(F11,F14) | G13,F11 | F12=G12*G11(F6) | F12 |
| T16 | F16 | F16 | G15(F11,F15) | G14,F11 | F13=G13*G11(F6) | F13 |
| T17 | F17 | | G16(F11,F16) | G15,F11 | F14=G14*G11(F6) | F14 |
| T18 | F18 | | G17(F16,F17) | G16,F16 | F15=G15*G11(F6) and F11 | F15 |
| T19 | F19 | | G18(F16,F18) | G17,F16 | F16 =G16(F11) | F16 |
| T20 | F20 | | G19(F16,F19) | G18,F16 | F17 =G17*G16(F11) | |

*Fig. 4b*

| TIME | CAMERA | COMPRESSION | GMP CALCULATION | TRANSMISSION | DECOMPRESSION+ GMP CALCULATION | DISPLAY |
|---|---|---|---|---|---|---|
| T1 | F1 | | | | | |
| T2 | F2 | F1 | | | | |
| T3 | F3 | | G2(F1,F2) | | | |
| T4 | F4 | | G3(F1,F3) | F1 | | |
| T5 | F5 | | G4(F1,F4) | G2,F1 | | |
| T6 | F6 | | G5(F1,F5) | G3,F1 | | |
| T7 | F7 | F6 | G6(F1,F6) | G4,F1 | | |
| T8 | F8 | | G7(F6,F7) | G5,F1 | | |
| T9 | F9 | | G8(F6,F8) | G6,F6 | F1 | |
| T10 | F10 | | G9(F6,F9) | G7,F6 | | |
| T11 | F11 | | G10(F6,F10) | G8,F6 | | |
| T12 | F12 | F11 | G11(F6,F11) | G9,F6 | | |
| T13 | F13 | | G12(F11,F12) | G10,F6 | | |
| T14 | F14 | | G13(F11,F13) | G11,F11 | F6 | |
| T15 | F15 | | G14(F11,F14) | G12,F11 | F2=mix{G2(F1), G2*G6$^{-1}$(F6)} | F1 |
| T16 | F16 | F16 | G15(F11,F15) | G13,F11 | F3=mix{G3(F1), G3*G6$^{-1}$(F6)} | F2 |
| T17 | F17 | | G16(F11,F16) | G14,F11 | F4=mix{G4(F1), G4*G6$^{-1}$(F6)} | F3 |
| T18 | F18 | | G17(F16,F17) | G15,F11 | F5=mix{G5(F1), G5*G6$^{-1}$(F6)} | F4 |
| T19 | F19 | | G18(F16,F18) | G16,F16 | F11 | F5 |
| T20 | F20 | | G19(F16, | G17,F16 | F7=mix{G7(F6), G7*G11$^{-1}$(F11)} | F6 |
| | | | | G18,F16 | F8=mix{G8(F6), G8*G11$^{-1}$(F11)} | F7 |

Fig. 4c

METHOD FOR GUIDING A REMOTE VEHICLE VIA LAGGED COMMUNICATION CHANNEL

FIELD OF THE INVENTION

The present invention relates to the field of remotely controlling a vehicle with the aid of imaging means. More particularly, the present invention is directed to a method and system for guiding a vehicle under lagged communication channel.

BACKGROUND OF THE INVENTION

In order to facilitate the reading of the description to follow, a number of terms and acronyms are defined below:

The term "camera" refers herein to a device, system or facility that captures a 3D reality/object and transforms it to a series of images. Nowadays producing images from a 3D object can be carried out by a variety of means, such as a radar signal, an infrared camera or a video camera. The images are referred to herein as "frames".

The term "vehicle" refers herein to any type of object that is guided by an inner guidance sub-system. Examples for such vehicles: a car, aircraft, satellite, torpedo, missile, ship, etc.

The term "automatic guiding system" refers herein to a system for guiding a vehicle towards a target object or area. In order to carry out this operation, the vehicle comprises a camera. Images captured by said camera are conveyed to a control center and presented on a display. By guiding the vehicle, or marking a target point or area on a displayed image, and by conveying the information relating to said marking of the vehicle, the vehicle's control mechanism (referred herein as "inner control loop" or "inner guidance sub-system") directs the vehicle's steering system to move towards the target point.

The term "operator" refers herein to a human being or automatic means (i.e., a computerized system) that makes the decisions as to what point or area to guide the vehicle. Concerning manual operation, the pointing can be carried out by a device (such as computer mouse, joystick, touch screen, and so forth). Concerning automatic means, neither a display nor pointing device is required, since an automaton can manipulate data without the intermediation of a display or pointing means.

Generally, in vehicle guiding systems that involve the transfer of images from the vehicle to a control center, the image signal is compressed in order to reduce the bandwidth required for transmission.

FIGS. 1, 2a, and 2b schematically illustrate a typical system for remotely guiding a vehicle by a human operator, according to the prior art.

At the vehicle 10: frames captured by camera 11 are compressed by a compressor 12 (generally a software/hardware component) and transmitted via transmitter 13 to the control center 20. The transmission from the vehicle to the control center 20 is referred to herein as "Downlink".

At the control center 20: the transmission is received by a receiver 21, decompressed by decompressor 22 (generally a software/hardware component) and the frames are displayed on display 23.

The operator 24 uses a pointing device 25 (such as a mouse) to mark on the screen 23 the target point to which the vehicle should be guided. The coordinates of the marked point are transmitted to the vehicle via transmitter 26 of the remote control center. The transmission from the control center to the vehicle is referred to herein as "Uplink".

Back at the vehicle the receiver 14 receives the control commands transmitted from the control center 20 and feeds them to the inner guidance sub-system 15. The inner guidance sub-system 15 further comprises a tracker or a navigation system (or both) 151 and a steering system 152 which directs the vehicle towards a certain point.

Compressing and decompressing of images is carried out in order to reduce the amount of the transferred data, and to suit the restrictions of a narrow-bandwidth communication channel.

The system described in FIGS. 1 and 2 consists of two control loops:

a. The inner control loop, on which the steering sub-system of the vehicle guides the vehicle to a defined target point.
b. The outer control loop, which comprises the downlink transfer to the operator and the uplink transfer of data from the control center to the vehicle.

The outer loop consists of the following stages:

a. The Sampling stage of the vehicle, in which the camera captures the images;
b. The Compression stage of the vehicle, in which the frames are compressed in order to reduce the amount of data;
c. The Downlink route, in which the compressed frames are transmitted to the control center;
d. The Decompression stage of the control center, in which the frames received at the control center are decompressed and displayed to the operator on the display;
e. The Pointing stage, at which the operator may (but need not) define a new target point; and
f. The Uplink route, in which the coordinates of the new target point are sent to the vehicle.

The inner loop at the vehicle adjusts the steering system of the vehicle to move towards the target point.

If the operator marks a new target point, then:
  The coordinates of the new target point are transmitted from the control center to the vehicle via the uplink;
  The inner loop mechanism adjusts the steering system to the new target point, and the vehicle is guided towards this target point.

Certain factors may cause a lag between the time an image is captured by the camera and the time the same frame is presented on the display at the remote control-center.

A major reason for this lag may be associated with the downlink bandwidth allocated for transferring the images. If the bandwidth is not wide enough, the use of compression techniques may be required. These techniques may involve skipping frames or using bidirectional estimation (referred to as B frames in the compression standards such as ISO 13818-2 (MPEG2-video). The lag between the captured frame and the displayed frame is inherent to both techniques. In general, video (or image) compression produces bits at a variable rate. Transferring these bits via a fixed bit-rate channel requires buffering (at both ends of the channel), and thus results in additional lagging.

There may be other obstacles that contribute to the lag, for example, when the communication path is made via relay stations, telephone lines, modems, Internet protocols, and so forth. The lag may appear in the downlink route, as well as in the uplink.

Due to this lag in displaying the image at the control center, the operator cannot deal with up-to-date displayed images. Moreover, until the coordinates of the marked point reach the vehicle, additional lag is created, and the vehicle is no longer at the position apparent to the operator when marking the target point.

A partial solution to this problem, as presented in the prior art, is the expansion of the bandwidth. In this way, a higher rate of transferred data between a vehicle and a control center can be obtained. However, the drawback of this solution is the exhausting of bandwidth resources. Due to the bandwidth restrictions, different solutions are required. Moreover, this solution, when applied, reduces only the compression lag, but has no affect on other causes of the lag.

EP 606,173 discloses a method and system for guiding a vehicle via a lagged communication channel, which comprises at the vehicle both a camera and a 3-D imager.

It is therefore an object of the present invention to provide a method and system for remotely guiding a vehicle via lagged communication channel, on which the control performance is higher than that known in the prior art under the same conditions. More specifically, it is a particular object of the present invention to provide compensations for delays due to the lagged communication channel in transferring images from the vehicle to its remote operator, and control signals from the operator to the vehicle.

It is still another object of the present invention to enable an essentially real-time control of a vehicle in a lagged communication channel, particularly when the bandwidth of the channel connecting the vehicle and the control center is narrow.

It is still an object of the present invention to perform the said vehicle guidance when the point to which the vehicle is guided is either static or moving.

It is still an object of the present invention to provide solutions to said problems in a compact, simple, and economical manner.

Other objects and advantages of the invention will become apparent as the description proceeds.

SUMMARY OF THE INVENTION

The present invention relates to a method for guiding from a remote control center a vehicle towards a target object, said remote control center communicating with the vehicle by means of a lagged communication channel, the method comprises the steps of:

At the Vehicle:
(a) Periodically capturing frame images by a camera, assigning to each of said captured frames an associated unique time stamp, and saving within a storage at the vehicle full frame data or partial frame data of captured frames and their associated time stamps;
(b) For a plurality of saved frames, sending to the control center via the lagged communication channel full frame data, partial frame data or a combination thereof with the corresponding associated time stamp for each sent frame so that approximate or exact version of the sent frames can be reconstructed and displayed at the control center;

At the Control Center
(c) Receiving said frame data and associated time stamps, sequentially reconstructing frame images from each said sent full and/or partial frame data, and displaying the reconstructed images on a display;
(d) Upon marking by an operator at the control cater a point on a specific displayed frame, sending coordinates indication relating to said marked point as appearing on said specific frame or on a reference frame available at the control center, and the time stamp associated with said specific or reference frame, as is the case, to the vehicle;

At the Vehicle:
(e) Receiving said coordinates indication as marked and the sent frame time stamp;
(f) Given the coordinates indication and frame time stamp as received, locating said point or object coordinates on a corresponding frame having a same time stamp at the vehicle, and using an image processing procedure, tracing (209,409) at a rate higher than said periodical frame capturing said point or object coordinates from the said frame towards the most recently available captured frame, thereby finding the coordinates of the same point or object as appearing in the most recently available captured frame; and
(g) Providing the coordinates of the target point or object within the most recently available captured frame, as found, to an inner guidance sub-system of the vehicle, for enabling it to track said object.

Preferably, each partial frame data represents an intermediate frame and each full frame data represents a reference frame.

Preferably, at least one intermediate frame is produced between any two reference frames.

Preferably, each partial frame data comprises a set of GMPs (Global Motion Parameters) indicating the global change of a given intermediate frame with respect to a previous reference frame, as calculated using a GMF (Global Motion Function).

Preferably reference frames are compressed at the vehicle before being sent to the control center, and decompressed at the control center.

Preferably, at least one set of GMPs is sent to the control center between any two compressed reference frames.

Preferably, a same GMF is used at the vehicle and at the control center.

Preferably, each reference frame is displayed after being decompressed at the control center.

Preferably, each intermediate frame is reconstructed and displayed at the control center, using the GMF and GMPs of same frame, as received, and data relating to a previous reference frame.

Preferably, when the operator marks a target on a displayed intermediate frame, the method further comprising backward activating a GMF to convert the marked coordinates to coordinates on a previous reference frame, before performing the fast forward tracing at the vehicle.

In one embodiment of the invention, the activation of the backward GMF is carried out at the vehicle.

In another embodiment of the invention the activation of the backward GMF is carried out at the control center.

According to one embodiment of the invention, when the method is used for guiding the vehicle towards a static target, only GMPs of intermediate and reference frames are saved at the vehicle. In that case, the fast forward tracing of the object coordinates from the reference frame towards the most recently available captured frame is carried out by means of cascade activating a GMF at the vehicle, starting from the object coordinates on a reference frame and applying the function on all or some of newer saved frame GMPs until determining said target coordinates to target coordinates on the most recently captured frame.

According to another embodiment of the invention, when the method is used for guiding the vehicle towards a dynamic target, full data frames are saved at the vehicle. In that case, the fast forward tracing of the object coordinates from the reference frame towards the most recently available captured frame is carried out by means of activating a fast forward object tracing utility at the vehicle, starting from the target coordinates on a reference frame and applying the utility on all newer saved frames until determining the coordinates of the target on the most recently captured frame.

When the method of the invention is used for guiding the vehicle towards a dynamic target, the fast forward object tracing utility at the vehicle first identifies the marked object region on a reference frame by means of the coordinates as provided from the control center, and then uses means such as correlation for determining the region movement in all newer saved frames until determining the coordinates of the target, being within said region, on the most recently captured frame.

Preferably, the said inner guidance sub-system is a system capable of tracking an object to a point, to a certain direction, or a combination thereof by means of a navigation sub-system, a tracker sub-system or a combination thereof.

Preferably, the full frame data representing a reference frame comprises pixel representation data of the frame. Preferably, the reference frame is reconstructed and displayed at the control center by using said pixel representation data.

Preferably, the full frame data further comprises at least one set of GMPs indicating the global change of the reference frame with respect to a previous reference frame.

Preferably, the reference frame is reconstructed and displayed at the control center by either using said pixel representation data or by substituting one of said set of GMPs indicating the global change of the reference frame with respect to a previous reference frame in a GMF.

BRIEF DESCRIPTION OF THE DRAWINGS

In the drawings:

FIGS. 4a, 4b, and 4c schematically illustrate three different methods for transferring frames at the outer control loop, and displaying them at the control center, according to three embodiments of the invention;

DETAILED DESCRIPTION OF PREFERRED EMBODIMENTS

Figure 1:
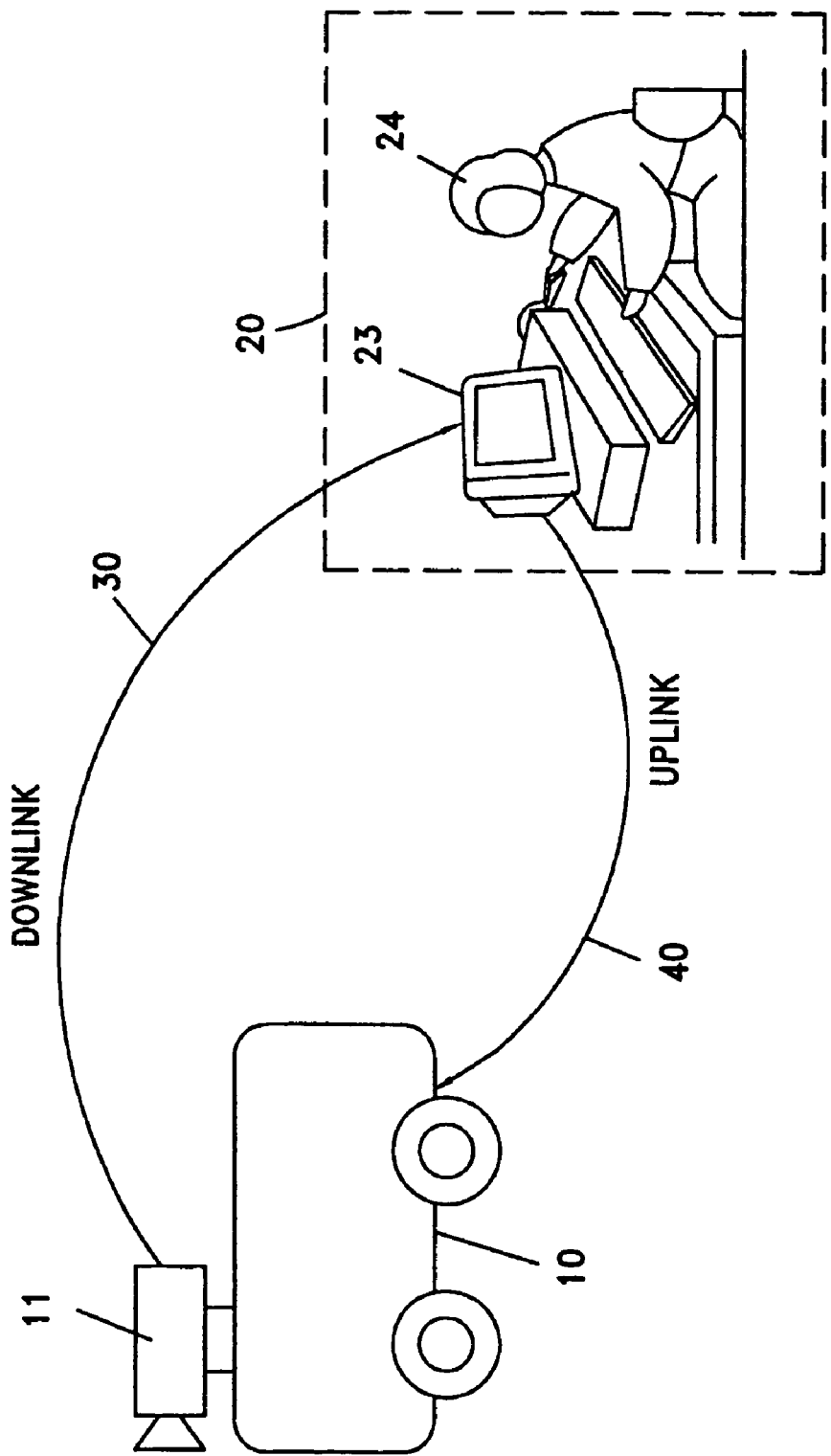
FIGS. 1 and 2a schematically illustrate a typical system for remotely and manually guiding a vehicle, according to the prior art.
Figure 2A:
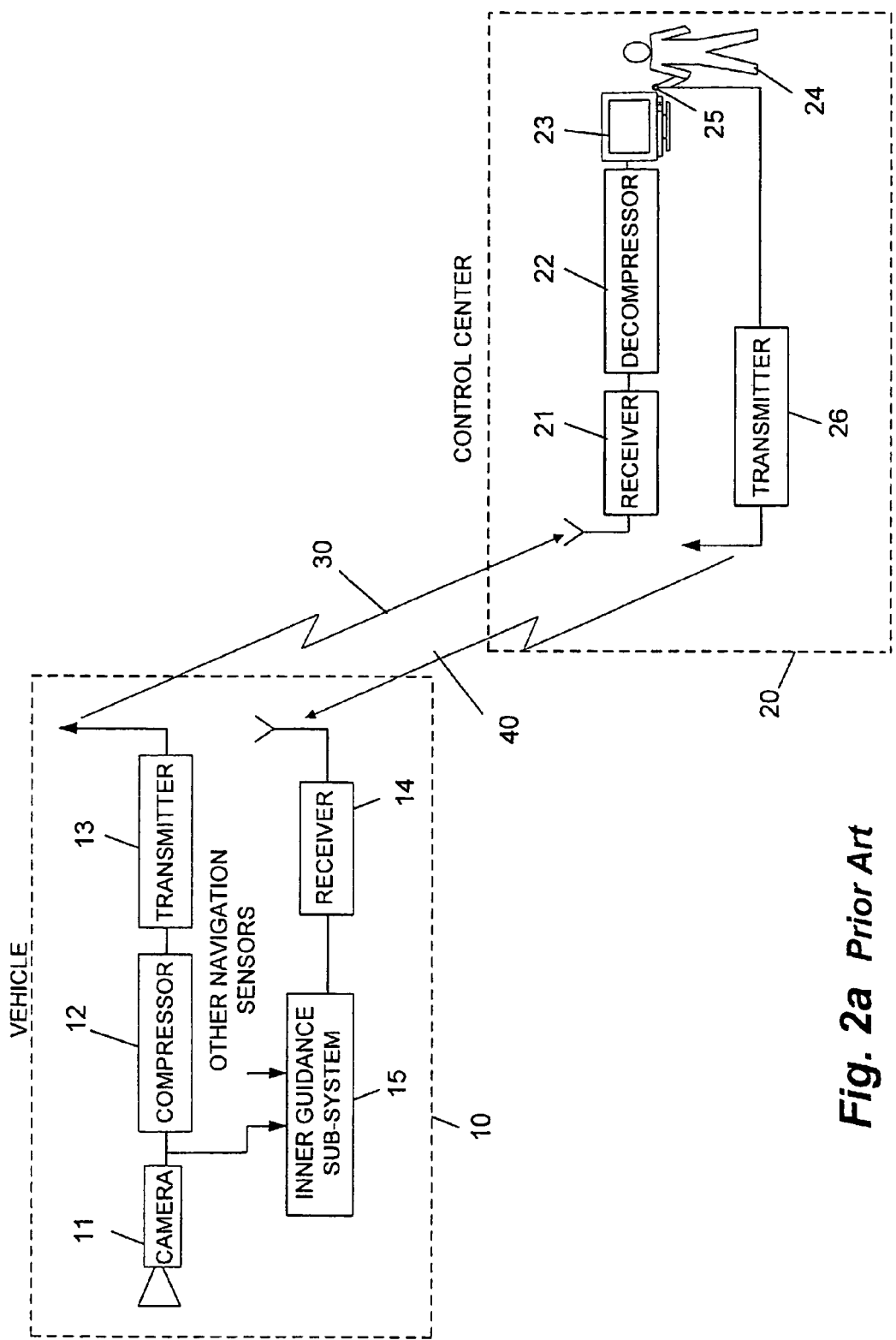
Figure 2B:
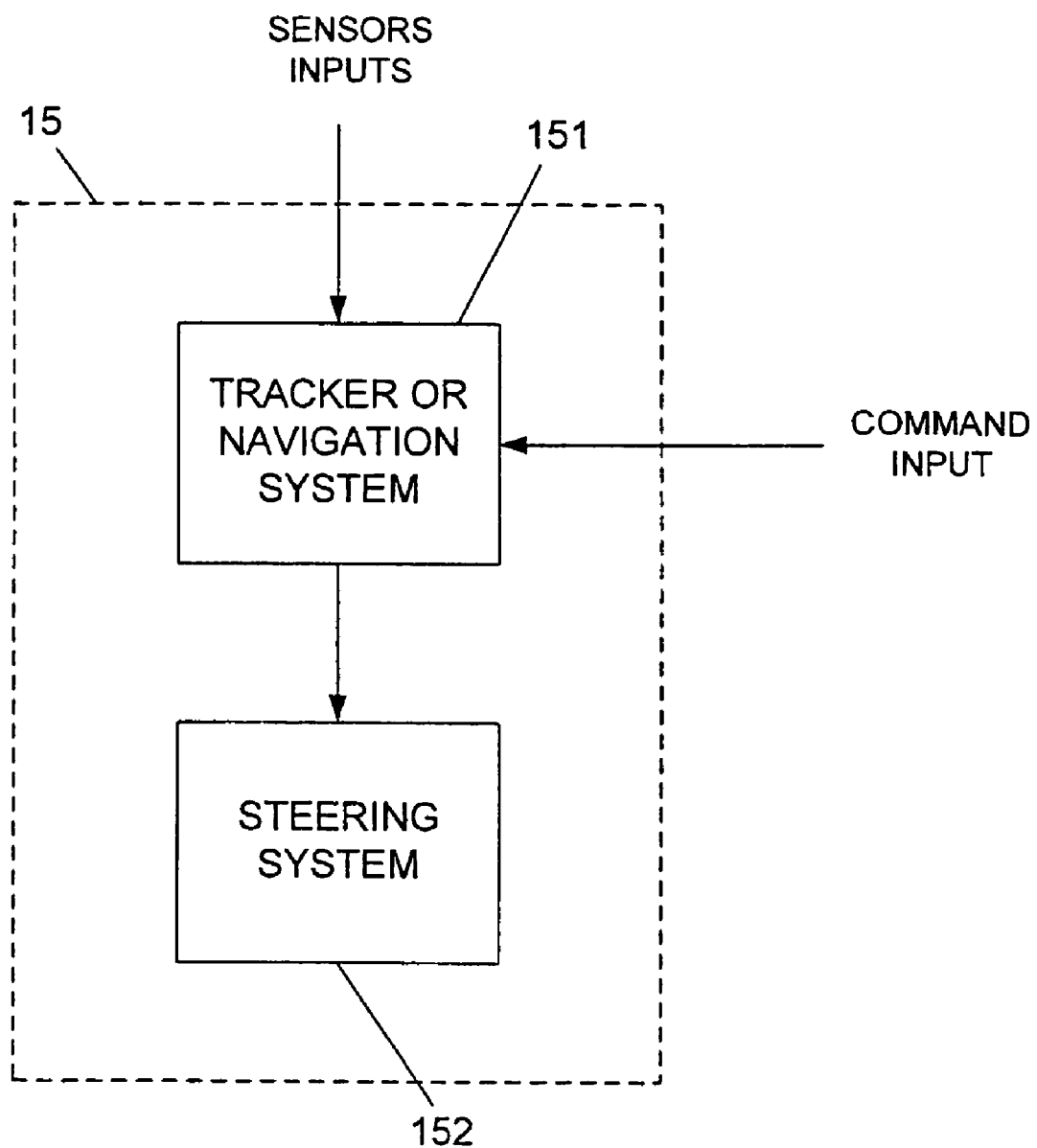
FIG. 2b shows the structure of the inner guidance sub-system, existing at the vehicle.

The camera provides a sequence of frames a portion of which eventually are presented to the operator to provide the information needed to guide the vehicle. While viewing these frames, the operator may mark a new target to which the remote vehicle should be guided. We refer to a sequence of images as "video sequence", even if the rate of images is too low to encompass this term. Typically, a sequence of frames having about 40 milliseconds between each adjacent frame, produces a "live" image.

U.S. Pat. No. 5,835,147 describes a video signal comprising a sequence of segments, each containing one "reference" frame (being the first frame of the segment) followed by one or more "intermediate" frames. In order to describe vehicle movement, a segment of video signal including a reference frame and mathematical expressions describing the change between any intermediate frame and a corresponding reference frame, is applied according to the present invention. It should be noted that the term "segment" when used herein refers to one reference frame, and zero or more consequent intermediate frames following said reference frame.

For example, a global change between two frames can be expressed as: $x'=G_x(x,y)$; $y'=G_y(x,y)$; wherein $(x',y')$ are the coordinates in an intermediate frame of a point in the scene that has the coordinates $(x,y)$ in the reference frame. The function $G \equiv [G_x, G_y]$, hereinafter referred to as the "global motion function" describes only the "global" change between a first frame and a consequent frame, and it assumes the change at all points within the frame satisfy a same function. The amount of data required to reconstruct said consequent frame from said given first frame, is minimal.

The term Global Motion Function (GMF) refers herein to a function describing the global motion occurring between a reference frame and a consequent frame. Given the reference frame and the GMF, the consequent (intermediate) frame can be constructed. The said intermediate frame is an approximation of the real time situation that should be displayed.

A simple example of such a transformation is a shift operation, i.e., the transformation is expressed by the functions $x'=a+x$; $y'=b+y$; where a and b are constants. More particularly, in this example, the intermediate frames are presented as the list of constants $a_1,b_1, a_2,b_2, a_3,b_3, \ldots, a_n,b_n$. In this way, the amount of bits required for transmitting the video signal (i.e., the frames) is significantly reduced. The reference frames can be compressed by compression methods known in the art, and hence, further reduce the amount of data required for storing the video signal. It should be noted that as an intermediate frame reconstructed by the GMF assumes a global, uniform movement of all the frame points with respect to points of a previous reference frame, its accuracy is limited, as it does not account for relative movement is of objects within the frame. Moreover, it of course does not account for new objects that meanwhile should be included within a real time frame due to the movement with respect to the reference frame, as such information is not available by conducting GMF transformation. The areas of the intermediate frame in which new information should be included are therefore displayed in the intermediate frame as blank areas. Other well-known GMFs are, for example: (a) the 4 parameter shift-rotate-zoom; (b) the more general 6 parameter affine transform ($x'=ax+by+e$, $y'=cx+dy+f$ where x,y are the coordinate in the reference image, x',y' are the coordinates in the second image and a,b,c,d,e and f are the transform parameters); (c) the 8 parameter perspective function; etc.

The term Global Motion Parameters (GMP) refers herein to the set of constants (parameters) used by said GMF for constructing the intermediate frame from the reference frame. Thus, if F1 and F2 are frames with great similarity, then GMF(F1,GMP)≈F2. (the symbol ≈ represents good approximation).

The term Global Motion Calculator (GMC) refers herein to a function for calculating the GMP from two frames with great similarity. Thus, GMC(F1,F2,GMF)=GMP.

According to the present invention a choice of the GMF type should be made a-priory, and a same choice should be known and applied both at the vehicle and at the control center site. If at any specific time one of sites determines to use a different GMF, it should transmit a signal to the other party informing it of the change, and allowing it to adapt itself to that change. Therefore, the following notation can be used:

GMP(F1,F2) denotes calculating the GMP using reference frame F1 and current frame F2 (equivalent to GMC(F1,F2, GMF)=GMP), and GMP(F1) denotes applying the GMF to F1 using the GMP (equivalent to GMF(F1,GMP)≈F2). Thus applying an inverse transform would be denoted by $GMP^{-1}$(F1) (equivalent of $GMF^{-1}$(F2,GMP)≈F1) and applying a cascade of transforms would be denoted by GMP2*GMP1 (F1) (equivalent of GMF(GMF(F1,GMP1),GMP2)≈F3).

For the sake of brevity, the term GMF is referred to herein as one function that is applied to the whole frame. In an embodiment of this invention the frame may be divided to sub-images (or spatial segments) and a different GMF may be used for each sub-frame (or spatial segment). Thus, the term GMP in that case, when used, may refer to a set of several GMPs.

Figure 3:
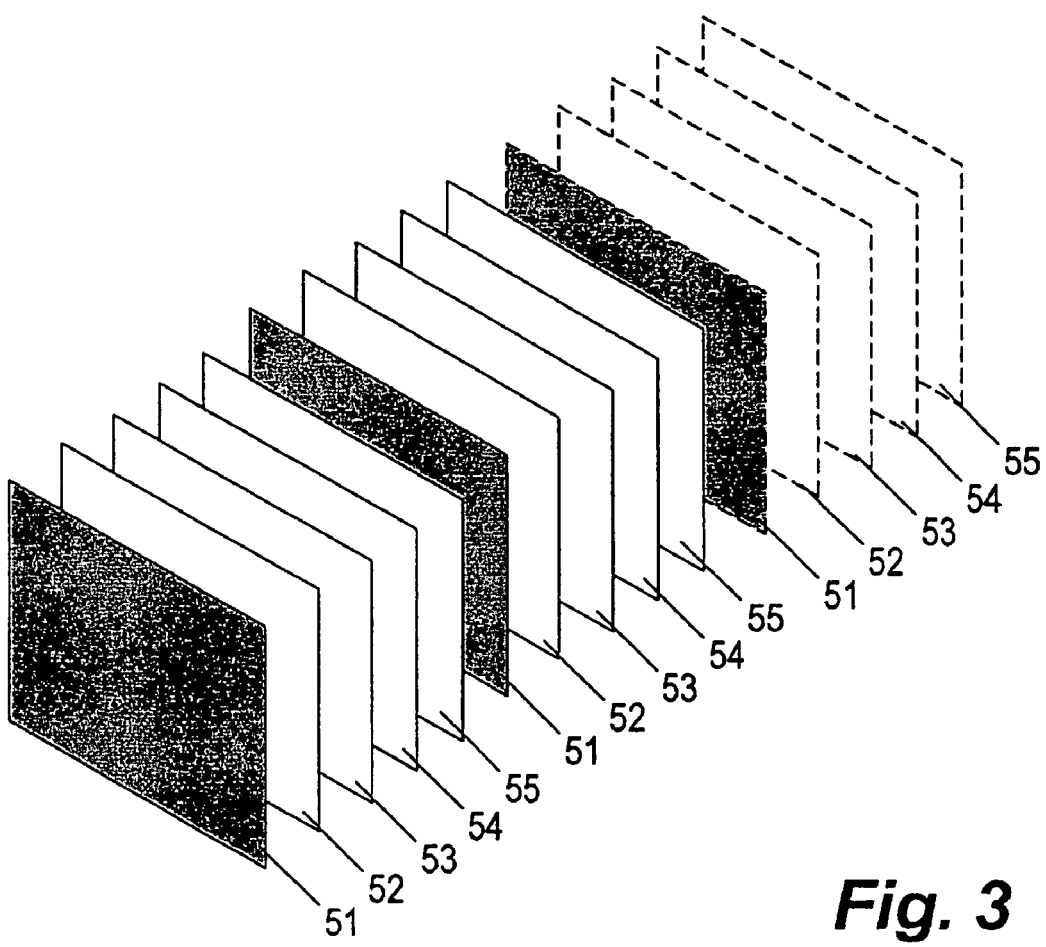
FIG. 3 schematically illustrates a compressed video signal, according to the prior art.

FIG. 3 schematically illustrates a compressed video signal, according to the prior art. A segment comprises the update frame 51, and the global motion parameters 52 to 55. As disclosed in U.S. Pat. No. 5,835,147, the intermediate frames are reconstructed using the reference frame 51 and the global motion parameters 52 to 55. Since the GMPs reduce the amount of data of a video signal, the use of GMP can be useful for the transfer of a video signal from a vehicle to a control center. The bandwidth may be further reduced by omitting the transmission of the GMP for some frames. In this case, the decompressor may produce an estimated GMP. For example, if the GMP of frame 53 is not transmitted, a proper estimation of it may be produced from the GMP of frames 52 and 54.

FIG. 4a provides a typical case describing some of the cases and problems that the present invention solves.

The columns are:

Time: Also referred to as "Time stamp". A sequential number presenting the frame number. Marked as T1, T2, T3, etc.

Camera: The frame number of the captured frame. Assuming the sample rate is constant, this column refers to the "time stamp". Marked as F1, F2, F3, etc. The time difference between two adjacent frames is referred to in this example as "Time slice".

Compression: The compression of the marked frames. The frames are compressed using image compression methods known in the art. In this example, only the frames F1, F6, F11, and F16 are presented to the image (or video) compressor. Moreover, in this example, it is assumed that the compression time is no more than one time slice, so after frame F1 is captured by the camera and stored in memory at time slice T1, it is already compressed at time slice T2.

GMP calculation: The global motion parameters are marked as G2, G3, G4, etc., wherein the index (2,3,4, etc.) is the number of the frame to which the GMP refers. The notation Gx(Fi,Fj) refers to the global parameters of frame x, computed from the reference frame Fi, and the consequent frame Fj. Each segment comprises the data Fi, Gi+1, Gi+2, Gi+3, . . . , Gi+n, wherein n is the maximal number of skipped frames, 4 in this example. In this example, it is assumed that the time required for calculating the GMP of one frame is no more than one time slice so, for example, at time slice T3 it is possible to calculate G2(F1,F2), since both F1 and F2 are already present in an internal memory.

Transmission: The transmitted information from the vehicle to the control center. In this example, the GMP is calculated and transmitted for every frame, but, as noted previously, in other embodiments of the invention some of the GMPs may not be transmitted, but rather estimated at the receiver site.

For the sake of brevity, in this example it is also assumed that each frame F1, F6, F11 . . . produces roughly the same number of bits transmitted for exactly 5 time slices. Actually, the number of bits produced due to the compression may vary significantly for each frame. Usually, maintaining a constant rate is preferable, and is performed, for example, by means of buffers. This principle is applied routinely in video compression schemes such as ISO 14496-2 (MPEG4-video).

It should be noted that practically, due to the compression methods, the compressed frames might differ in their size. Typically, the size of a data file representing a compressed frame that comprises more details is greater than the size of a file representing a same compressed frame that comprises fewer details. For compression methods using I, P and B frames (e.g., ISO 14496-2) the compressed I frame is typically larger than a compressed P or B frame. Thus, the transferred stream of data per segment is not constant, and hence its transmission time is also not constant.

Decompression and GMP calculation: The decompression is performed at the control center. The compressed frames (in this example, F1, F6, F11 . . . ) are decompressed. In addition, the skipped frames are reconstructed by applying the inverse global transform on the relevant reference-decompressed frame. For example, at time slice T9, the transform with parameters G2 is applied to the decompressed reference frame F1 in order to produce a reconstruction of the frame F2. In this example, the duration of decompressing a frame is not greater than one time slot. Frames indicated by italic characters denote reconstructed frames rather than source frames.

Display: This column indicates at each time slot the frame that is displayed at the control center display.

As is demonstrated in this example, a frame F1 which has been captured in time slice T1 is displayed on the control center display only in time slice T9. More particularly, in this example, the total lag is 8 frames, i.e., at the time stamp Fi was captured, the operator watches frame F(i-8). Later, in time slices T10, T11, T12, and T13, intermediate frames F2 to F5 respectively are displayed.

The above example has been given for the sake of brevity, and the details may vary from one system to another.

In this example, the notation F1 refers to reconstructing the original frame F1 from a compressed frame. The notation G2(F1) (or F2=GMF(F1,G2)) refers to reconstructing an approximation of frame F2 from the global motion parameters G2 and the reference frame F1. The reconstructed frames will be displayed on the operator's display.

In the above example the number of skipped frames is constant (4 in this example). In another embodiment of the present invention, an 'adaptive' system is used. In such an adaptive system the number of skipped frames is not kept constant but is rather dynamically changed depending on occupancy of the buffers. The idea of controlling system parameters according to buffer occupancy is not new (see ISO14496-2). A simple embodiment of the adaptive embodiment of the present invention can set a threshold on the number of bits waiting to be transmitted in the output buffer at the vehicle site. Only when the number of bits in the buffer is lower than the threshold, the next frame is set to be a reference frame.

Marking a Static Target Point

The vehicle is equipped with a inner guidance sub-system that comprises an inner control loop for guiding the vehicle towards a marked target point. The target point may be static (for example, a fixed point in the scenery) or dynamic (for example, another moving vehicle). This section deals with the tracking of a static target point. An embodiment of the present invention dealing with the tracking of a dynamic target point follows.

Due to the lag of the communication in the downlink channel (i.e., from the vehicle to the control center), at the time the operator marks on a displayed frame an object to which the vehicle should be guided, the vehicle may not be present in this place anymore. Moreover, due to the uplink lag, when the control instruction to the vehicle which encapsulates this mark arrives back at the vehicle, the vehicle is most probably further away from the location of the vehicle when the mark has been set.

According to the present invention two alternative embodiments can be used in order to overcome this obstacle, enabling the operator to guide the vehicle to a static object. As is shown hereinafter the two embodiments differ by the location in which the "trace backward" step is performed. In the first embodiment this step is performed at the control center. In the second embodiment this step is performed at the vehicle.

First Embodiment

At the Vehicle a. Each frame is marked by a "time stamp", such as a unique sequential number. In this way, each frame can be identified both at the vehicle and at the control-center. In addition, some frames are designated as 'reference' frames and all the other frames are designated as 'intermediate' frames.
b. The global motion parameters for each frame (referenced to a previous 'reference' frame) are computed. These GMPs (and optionally the reference frames) are stored at the vehicle, along with their associated time stamps. Optionally, the full images with their associated time stamps may be stored at the vehicle.
c. Compressed reference frames, and calculated GMPs representing intermediate frames, each with its associated time stamp, are sequentially sent to the control center.

At the Control Center d. The frames are displayed to the operator. Reference frames are first decompressed and then displayed, and intermediate frames are reconstructed using a GMF, given the corresponding GMPs of each intermediate frame and a corresponding previous reference frame.
e. The operator marks a target point.
f. A trace backward of the marked point is performed, to obtain the coordinates of a same object on a previous reference frame available at the control center. If the point has been marked on a reference frame, the trace backward to a reference frame is of course not necessary.
g. The coordinates of the marked object as found on a reference frame and the reference frame associated time stamp are transmitted to the vehicle.

At the Vehicle h. Upon receiving of the marked coordinates and the time stamp of the reference frame, and having stored at the vehicle all more recent GMPs until the currently captured frame, a forward tracing calculation which involves calculation of a plurality of GMFs in which the stored GMPs are sequentially substituted, to find the location of the target point appearing on the most recently captured frame. This calculation is performed as fast as possible to catch up with the currently captured frame. As this calculation is a relatively simple calculation, it can be generally performed within a short period, typically less than one time slice.
i. The vehicle is instructed to move towards the updated marked coordinates on the current frame. As mentioned above, the vehicle has the ability to manipulate its steering system in order to reach a defined point (as is known in the art). Moreover, the coordinates of the marked object are continuously updated within the vehicle, when new frames are captured, as long as no new target is marked.

Second Embodiment

At the Vehicle a. Each frame is marked by a "time stamp", such as a unique sequential number. In this way, each frame can be identified both at the vehicle and at the control-center. In addition, some frames are designated as 'reference' frames and all the other frames are designated as 'intermediate' frames.
b. The global motion parameters for each frame (referenced to a previous 'reference' frame) are computed. These GMPs (and optionally the reference frames) are stored at the vehicle, along with their associated time stamps.
c. Compressed reference frames, and calculated GMPs representing intermediate frames, each with its associated time stamp, are sequentially sent to the control center.

At the Control Center d. The frames are displayed to the operator. Reference frames are first decompressed and then displayed, and intermediate frames are reconstructed using a GMF, given the corresponding GMPs of each intermediate frame and a corresponding previous reference frame.
e. At the control center the operator marks a target point on a displayed frame. The coordinates of the marked object as found on the displayed frame and the frame time stamp are transmitted to the vehicle.

At the Vehicle f. Upon receiving of the marked coordinates and the time stamp of the frame, the marked point coordinates are first traced backward within the saved frames at the vehicle to obtain the coordinates of a same object on a previous reference frame available at the vehicle using the stored GMPs. If the point has been marked on a reference frame, the trace backward to a reference frame is of course not necessary.
g. A a forward tracing calculation which involves calculation of a plurality of GMFs in which the stored GMPs are sequentially substituted, to find the location of the target point appearing on the most recently captured frame. This calculation is performed as fast as possible to catch up with the currently captured frame. As this calculation is a relatively simple calculation, it can be generally performed within a short period, typically less than one time slice.
h. The vehicle is instructed to move towards the updated marked coordinates on the current frame. As mentioned above, the vehicle has the ability to manipulate its steering system in order to reach a defined point (as is known in the art). Moreover, the coordinates of the marked object are continuously updated within the vehicle, as new frames are captured, as long as no new target is marked.

The tracing of a static target point from the frame on which it was marked to the current frame is a matter of applying a cascade of GMFs operations using the stored GMPs.

For example, with reference to FIG. 4a, suppose that at time slice T11 a target point was marked at coordinates (x,y). At this time the displayed image is F3. The coordinates (x,y) along with the time stemp '3' are sent to the vehicle. Suppose that due to uplink lag, the message conveying the target point and time stamp arrives at the vehicle site at time slot T16 (in which the last captured frame is F15). Now the vehicle has to trace the target point from F3 to F15. That can be done in two steps:

1. Trace back the target point from the frame on which it was marked to the last reference frame preceding it. In this example the preceding reference frame is F1. Since F3 is an intermediate frame it is actually a warped version of the reference frame F1: F3=GMF(F1,G3). That means that a pixel in location (x,y) within F3 is the same as the pixel in location (u,v) in F1 where (x,y)=GMF([u,v],G3). The location of the target point in the reference frame can be easily restored by the inverse transformation: (u,v)=$GMF^{-1}$([x,y],G3).
2. Forward tracing the target point from F1 to F15. This is done merely by cascading transforms from F1 to F15. In this example there are two reference frames F6 and F11 between F1 and F15 so the tracing will go from F1 to F6, to F11 to F15. i.e. the target point which will be presented to the inner loop is: (s,q)=GMF(GMF(GMF((u,v),G6),G11),G15), or, in a simpler notation [s,q]=G15*G11*G6(u,v). Combining the last two steps together yields: [s,q]=G15*G11*G6*$G3^{-1}$(x,y).

Marking a Dynamic Target Point

As said, there are two types of photographed objects—static objects, such as buildings, trees, roads, etc., and moving objects, for example, vehicles. To track a mobile (moving) object, the controlled vehicle has to be equipped with an object tracing utility. The term "object tracing utility" refers herein to a utility (software and/or hardware) that can detect where a predefined object (e.g., an object marked on a previous frame of the same video sequence) appears on a frame. As known to the skilled person, tracing an object on a frame sequence is a well-known subject in the art, and hence this subject is not discussed further herein. Sophisticated trackers can cope with a complicated situation such as maneuvering of the tracked object as well as maneuvering of the tracking vehicle itself. A typical object tracking utility may use a criterion of maximum correlation to track an object between two frames. Some other known techniques are edge detection, change detection, feature extraction and tracking, fuzzy logic, and more, or a combination thereof. According to the present invention, the vehicle has an object tracking utility of some sort, which is a part of the inner loop so that once the operator marks an object to be tracked, the vehicle autonomously tracks the object. Still, it is usually the task of the operator to see that the tracking is maintained and to update or change the tracking point when needed (e.g. if the vehicle approaches the tracked object, new details may become apparent). To mark a target point or for changing it, the operator uses the outer loop, which as said is a lagged loop.

Marking a dynamic target-point suffers from the same problems as described above in the section "Marking a static target-point" and, on top of it, it suffers from problems stemming from the fact that the object to be tracked is moving. When the operator marks a point on the displayed frame, not only that the tracking vehicle is not at the point in which it was when the frame was taken, but also the tracked object has most probably moved in an unpredictable manner. By the time the control instruction to the vehicle (encapsulating this mark) arrives back to the vehicle, both the vehicle and the object to be tracked may be even further away.

Another difficulty arises when, in attempt to further reduce the communication bandwidth, one uses the system described above of reference and intermediate frames. Since only one frame of a video segment (the reference frame) is a photographed image, and the others (the intermediate frames) are transformations of this image, on the decompressed video signal the "motion" of static objects is smooth, while the "motion" of mobile objects is "jumpy". In other words, since the transformations express global information about the frames and not detailed information about objects within the frames, the result of mobile objects is "jumpy"(The moving object appears to be "glued" to it's surroundings when intermediate frames are displayed and its location is really updated only when reference frames are displayed).

Figure 5B:
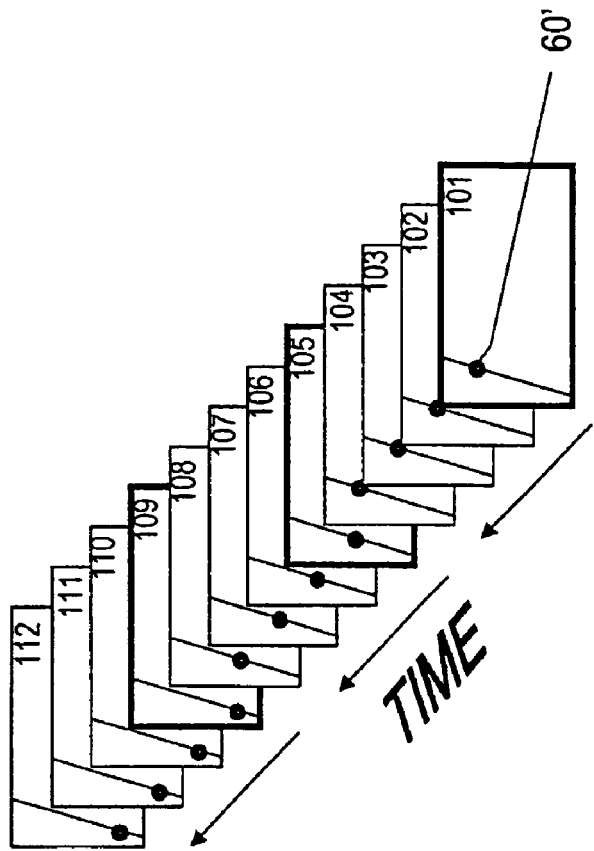
FIG. 5b schematically illustrates the video frames of FIG. 5a, as presented on the operator's display, according to one embodiment of the invention.
Figure 5A:
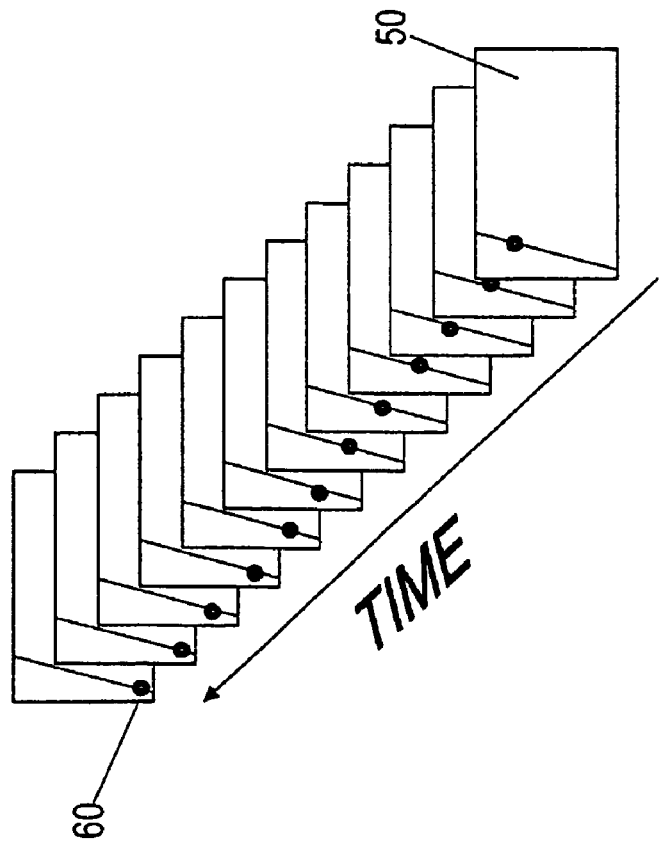
FIG. 5a schematically illustrates a sequence of video frames taken by a camera mounted on a vehicle.

FIG. 5a schematically illustrates a sequence of video frames photographed by a camera mounted on a vehicle.

FIG. 5b schematically illustrates the video frames of FIG. 5a, as presented on the operator's display, according to one embodiment of the invention.

In FIG. 5b, the reference frames are emphasized, as may be seen in frames 101, 105, and 109, and the intermediate frames are not emphasized.

The object 60 moves from the left upper corner downwards as is reflected in the capture frames of FIG. 5a. For the sake of simplicity, the vehicle is assumed to be static, thus the transformation equations are x'=x; y'=y. Hence, according to the compression method described above in which each segment contains a reference frame and a plurality of intermediate frames, the position of the object 60 along a segment, i.e., within the reference frame and the following intermediate frames is constant, as is shown in FIG. 5b. More particularly, the correct location of a moving object is reflected only within reference frames. The intermediate frames reflect only a global change with respect to a previous reference frame, evolving from the moving of the vehicle. Objects within intermediate frames are displaced by a same distance with respect to their location within the previous reference frame. Therefore, this same amount of displacement is proper for all static objects within the scene. However, for a moving object, as is object 60, the real location of the object is not reflected in the intermediate frames, but is correctly shown only within the reference frames 101, 105, 109, etc. As is shown in FIG. 5b (which as said assumes no global motion, for the sake of brevity) the location of the moving object 60' is constant within the reference frames and the following intermediate frames (for example, within frames 101, 102, 103, and 104), and is updated only at the next reference frame (e.g., frame 105).

According to one embodiment of the invention, in order to overcome these problems, a fast object-tracing utility is provided (at the vehicle) and the following steps are taken:

a. Each frame is marked by a "time stamp" (same as in the static target-point case).
b. At the vehicle, the global motion parameters for each frame (referenced to the last 'reference' frame) are computed. The frames are stored along with their GMPs and their associated time stamp.

c. The coordinates of the point as marked at the control center, and the time stamp of the frame on which the mark has been made are transmitted to the vehicle (in a same manner as in the static target-point case).

At the Vehicle:

d. Upon receiving at the vehicle the marked coordinates and the time stamp of the frame on which the mark has been made, the point is first virtually "marked" on the corresponding saved frame (same as in the static target-point case).

e. A tracing calculation is performed to find the location of the point appearing on the most recent frame. This calculation is performed as fast as possible to catch up with the currently captured frame. Then, the vehicle is instructed to move towards the updated marked coordinates on the current frame. As mentioned above, the vehicle has the ability to manipulate its steering system in order to reach a defined point.

The tracing of a dynamic target point from the frame on which it was marked to the current frame is done in two steps. The first step is identical to the corresponding step in the case of a static target point. The second step makes use of the fast object tracing utility to trace the object using frames stored in the memory. This issue will be clarified using the same example used for the static target point case, referring to FIG. 4a:

Suppose that at time slice T11 a target point was marked at coordinates (x,y). At this time the displayed image is F3. The coordinates (x,y) along with the time stamp '3' are sent to the vehicle. Suppose that due to an uplink lag, the message conveying the target point and time stamp arrives at the vehicle at time slice T16 (in which the last captured frame is F15). Now the vehicle has to trace the target point from F3 to F15.

That can be done in two steps:

1. Trace back the target point from the frame on which it was marked to the last reference frame preceding it. In this example the preceding reference frame is F1. Since F3 is an intermediate frame it is actually a warped version of the reference frame F1: F=GMF(F1,G3). That means that a pixel in location (x,y) in F3 is the same as the pixel in location (u,v) in F1 where (x,y)=GMF([u,v],G3). The location of the target point in the reference frame can be easily restored by the inverse transformation:

$(u,v)=GMF^{-1}([x,y],G3)$.

2. Forward tracing the target object from F1 to the most recent captured frame. The fast object-tracing utility is used to perform this task. This utility is fed with the sequence of frames fetched from memory starting from F1 to the last captured frame. Since the fast object-tracing utility can process the incoming frames very fast it soon exhausts the frames in memory. After it process the last frame in memory it conveys the coordinate of the tracked object to the inner loop and the inner loop continues tracking in a regular manner. For example: if the regular video rate is 25 frames/sec (40 milliseconds per frame) and the fast object-tracing utility is capable of tracing an object in a frame in 5 milliseconds, then at time slice T16 it will trace the object in frames F1,F2,F3,F4,F5,F6,F7 and F8, and in time slice T17 it will trace the object in frames F9,F10,F11,F12,F13,F14,F15 and F16 (which is the last captured frame for this time slice) and provide the object coordinates to the inner loop.

As the first of these two steps is identical to the case of static target point, the comments regarding this step apply also to the case of dynamic target point, namely:

i. this step is omitted if the marking happen to be on a reference frame; and
   ii. this step may be performed at the control center rather than at the vehicle.

As shown, the steps taken at the control center for guiding the vehicle towards static or moving target points are identical. A difference exists only at the vehicle, as follows:

In the 'static' case the vehicle can only store GMPs and it has to forward calculate the target coordinates up to the current frame based on those GMPs. However, the same task can also be performed with full images, of course.

In the 'dynamic' case the vehicle has to store full video frames and run a fast object-tracing utility to trace the target from the marked frame to the current frame.

Typically, assuming a video signal comprises dynamic objects, the number of frames to be stored at the vehicle should be at least the number of lagged frames in the system. The number of stored frames may be reduced, e.g., by storing every other frame, if the tracing utility used is capable of tracing an object in a diluted sequence (typically compensating by enlarging the search area).

Of course, the lag is not always constant. Hence, a security factor should be taken, i.e., the stored frames and associated GMPs should be greater than anticipated.

It should be noted that the distinction between a 'fast' object-tracing utility of the outer loop and the 'regular' tracker of the inner loop is a matter of convenience: the two tracers may be just one tracer operating in two different modes.

In an embodiment of the present invention which is capable of guiding a vehicle towards both a static or dynamic target point, it is the roll of the operator to designate to the vehicle if he/she/it wishes to refer to a static or dynamic target point.

Some algorithms make use of skipping frames (i.e., these frames are not captured and processed at all) in order to reduce the frame rate. Instead, the skipped frames are "filled in" by a motion compensated version of previous transmitted frames. Because the GMP of such frames is not calculated and transmitted, an estimation of the GMP is used instead. For example, an estimated GMP may be calculated either by extrapolating from previous transmitted GMPs or by interpolating from previous and subsequent transmitted GMPs (using delay). Extrapolation or interpolation may be carried out by methods well known in the literature, such as linear weighing or Kalman filtering. In the case of tracking a dynamic target-point the tracing utility should be able to trace objects in a diluted video sequence.

The same GMF is used at the vehicle and at the control center. In a possible embodiment of this invention either the vehicle or the control center may wish to use some other GMF. In this case the side that initiate the change should notify the other side (by means of the communications channel) which GMF to use and when (i.e. on which time stamp) the change should be effected. A set of GMFs may be stored in each side (i.e transitional, affine, perspective, etc.). One of the GMFs is set to be the default one i.e. the one that is used upon startup of the system. In that case, when one side wishes to change the GMF, it only has to send the index of the said GMF and the time stamp for effecting the change.

To increase the quality of the reconstruction and tracking, the GMC may divide the image into several parts (spatial segments) and compute separate GMPs for each part (optionaly based on different GMFs). In that case it must convey all the relevant data for reconstruction and back-tracking to the control center, i.e. the segments boundaries, the GMF used at each segment and the resulting GMPs.

Figure 6A:
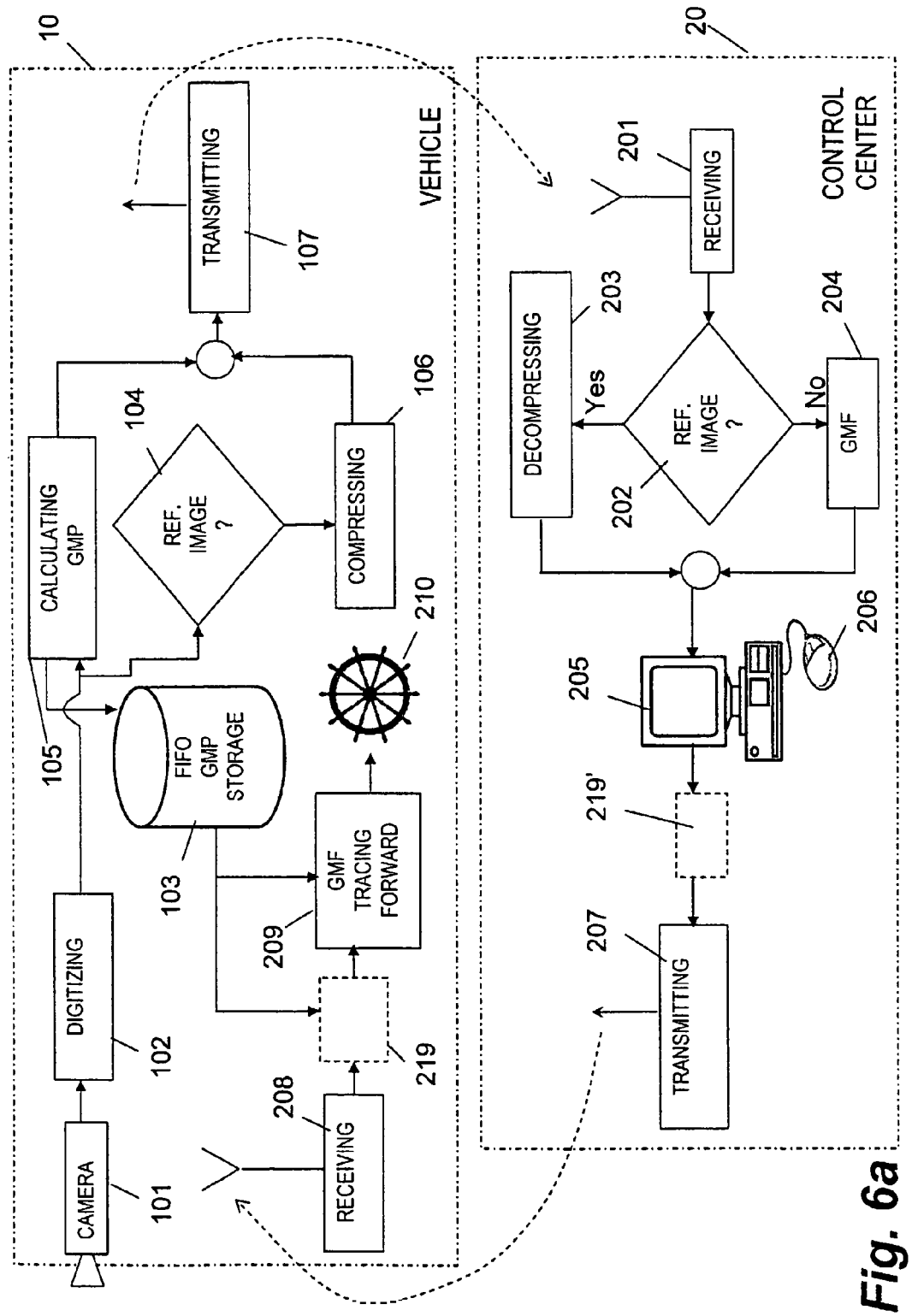
FIG. 6a is a block diagram of a system for guiding a remote vehicle to a static target via lagged communication channel, according to one embodiment of the invention.

FIG. 6a is a block diagram of a system for guiding a remote vehicle towards a static object via lagged communication channel, according to a preferred embodiment of the invention.

At step 101, the camera photographs a view from the front of the vehicle 10;

At step 102, the images are captured and digitized forming image files referred to herein as "frames";

At step 104, if the frame is a reference frame, i.e., the first frame of a segment, then the system proceeds to step 106, wherein the image is compressed.

In step 105, the GMPs are calculated using the GMF, and stored in storage 103;

At step 107, the frame data (compressed frame and/or GMPs) along with its associated time stamp is sent to the control station;

At step 201, the transmission is received at the control center;

At step 202, if it is the first image of a segment (reference frame), the frame is obtained by decompressing the data at step 203. Otherwise, if it is an intermediate frame, the frame is obtained by applying the GMF with of the GMP at step 204. Of course, there are numerous ways to indicate if the data belongs to a reference frame or to an intermediate frame, e.g., setting a flag in a data header of the information relating to each transmitted frame;

At step 205, the image is displayed on a monitor at the control center;

At step 206, the operator marks a target point on a displayed frame. Assuming that the tracing backwards utility 219 is installed at the vehicle, he coordinates of the target point and the time stamp of the frame are transmitted to the vehicle (at step 207);

At optional step 219, if the trace backwards utility is not installed at the vehicle, a trace backward is performed before the transmission. More particularly, the marked coordinates are traced backwards to the proximate older reference frame, and the resulting coordinates, together with time stamp of said reference frame are transmitted to the vehicle.

At step 208, the transmission from the control station is received at the vehicle;

At optional step 219, assuming that the trace backwards utility is indeed installed at the vehicle, a trace backward is performed. More particularly, the marked coordinates on the frame are traced backwards to the proximate older reference frame.

At step 209, the marked object is traced forward from its location within said reference frame to its location within the most recent captured frame, by means of a series (cascade) of GMF calculations;

At step 210, the steering inner guidance sub-system of the vehicle is provided with new coordinates to be guided to. The term steering system should be taken here in the broad sense as it may also include an inner tracking loop.

In any case, old frames no longer relevant to the operation and their time stamp are discarded from the FIFO storage.

Figure 6B:
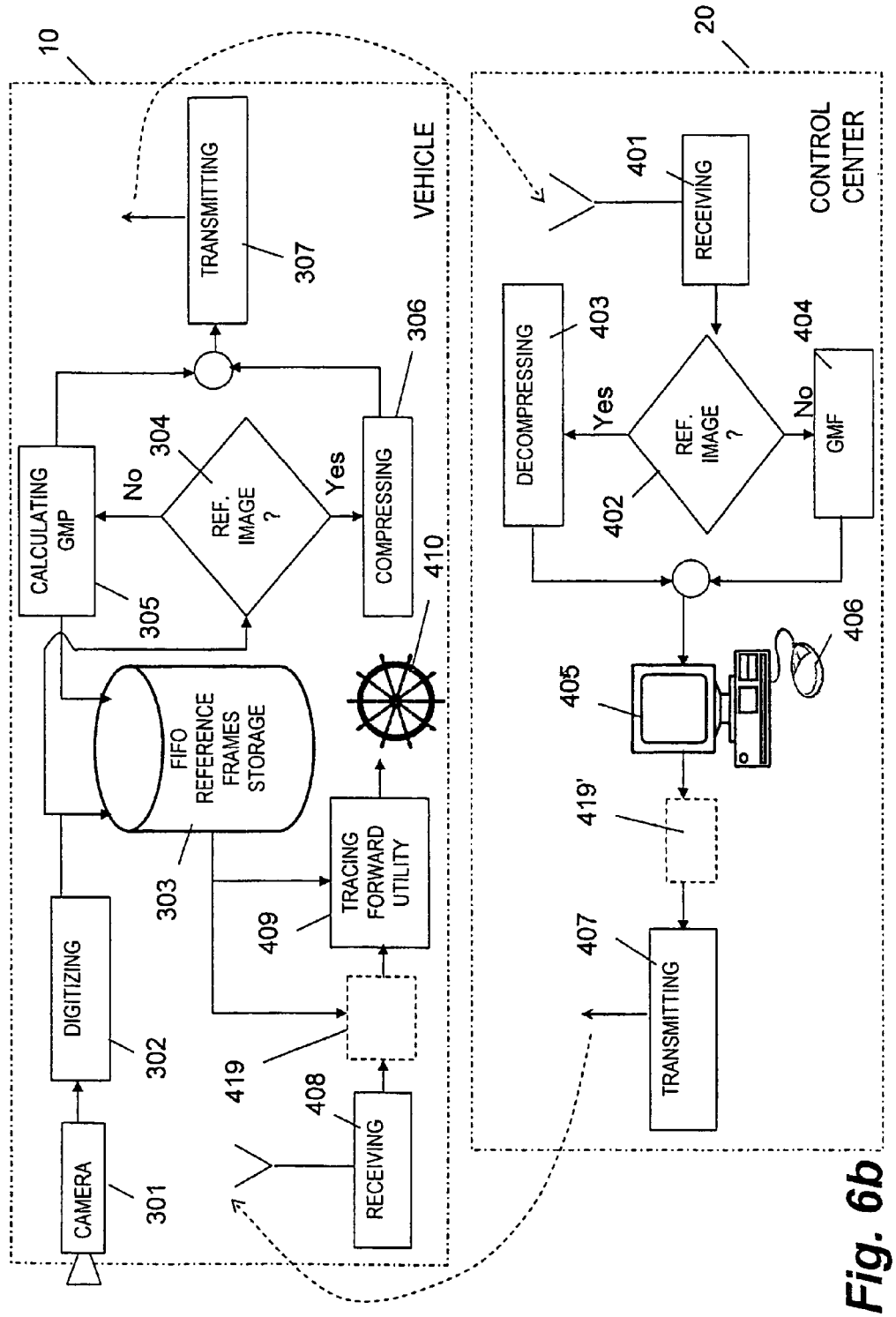
FIG. 6b is a block diagram of a system for guiding a remote vehicle to a dynamic target via a lagged communication channel, according to another embodiment of the invention.

FIG. 6b is a block diagram of a system for guiding a remote vehicle towards a dynamic object via a lagged communication channel, according to an embodiment of the invention.

At step 301, the camera photographs a view from the front of the vehicle 10;

At step 302, the images are captured and digitized forming image files also referred to herein as frames;

At step 303, the full data of captured frames is stored in a memory along with their associated time stamp;

At step 304, if a frame is a reference frame, i.e., the first frame of a segment, then the procedure proceeds to step 306, wherein the image is compressed. Otherwise, If the frame is an intermediate frame, the procedure of the system proceeds to step 305, wherein the GMP of the frame is calculated (using a GMF), and stored in storage 303;

At step 307, the frame data (compressed frame or GMP) along with its associated time stamp is sent to the control center 20 via the lagged channel;

At step 401, the transmission is received at the control center;

At step 402, if it is the first image of a segment (reference frame), the frame is obtained by decompressing the data at step 403. Otherwise, if it is an intermediate frame, an image frame is obtained by applying the reverse GMF 404 with said received GMP. Of course, there are numerous ways to indicate if the data belongs to a reference frame or to an intermediate frame, e.g., setting a flag in a data header of the information relating to each transmitted frame;

At step 405, the image, whether being a reference frame or an intermediate frame, is displayed on a monitor;

At step 406, the operator marks a target point on a displayed frame. Assuming that the tracing backwards utility 419 is installed at the vehicle, he coordinates of the target point and the time stamp of the displayed frame are transmitted to the vehicle at step 407;

At optional step 419 if the trace backwards utility 419 is not installed at the vehicle, a trace backward is performed at the control center before the transmission. More particularly, the marked coordinates are traced backwards to the proximate older reference frame, and the resulting coordinates, together with time stamp of said reference frame are transmitted to the vehicle (again, step 407).

At step 408, the transmission is received at the vehicle;

At optional step 419, assuming that the trace backwards utility is indeed installed at the vehicle, a trace backward is performed. More particularly, the marked coordinates on the frame are traced backwards to the proximate older reference frame.

At step 409, the marked object is traced forward in a fast manner from its location within said reference frame to its location within the most recent captured frame, by means of a fast object tracking utility;

At step 410, the steering inner guidance sub-system of the vehicle is provided with the coordinates resulting from step 409, to be guided to. The term steering system should be taken here in the broad sense as it may also include an inner tracking loop.

In any case, old frames no longer relevant to the operation and their time stamp are discarded from the FIFO storage 303.

It should be noted that several problems may exist in the system as disclosed, as follows:

1. The GMF, when applied to a reference frame, produces an intermediate frame containing blank areas with no information. These blank areas originate from the fact that the intermediate frame may contain 'new' parts of the scenery that were not visible to the camera when the reference frame was taken and thus cannot be reconstructed by applying the GMF to the reference frame.

2. There may be cases in which an operator at the control center marks an object (or an area) within a frame, that, until the coordinates of said marking are transferred to the vehicle and transformed to coordinates in the most currently captured frame, are found to be out of said frame.

FIGS. 4b and 4c disclose two embodiments of the invention in which said drawbacks are resolved, at least to some extent.

The object of the embodiment of FIG. 4b is to display at the control center frames that are most updated in their point of view, with a minimal lag, although they may include blank areas.

In the Embodiment of FIG. 4b

In time stamp T9 the reference frame F1, which completes its arrival to the control center at time T7 and decompressed during time T8, serves as a basis for performing the calculations required for the reconstruction of frame F6 by using GMP G6 which has just arrived.

In time T10, frame F6 is displayed. It should be noted that at time T10 the reference frame F6 is not yet available at the control center (this can be seen in the column TRANSMISSION). Thus, although a better reconstruction of F6 can be obtained at a latter time by decompressing the reference frame F6, a maybe poorer reconstruction of F6 is obtained by transforming older reference frame (F1) using the latest GMP. To distinguish between the two possible reconstructions of a frame, the reconstruction obtained by decompressing a compressed frame has been denoted by bold italic fonts (e.g. F6) and the reconstruction of a frame using GMF on a reference frame has been denoted by italic fonts (e.g. *F6*).

Then, in times T11 to T13, the intermediate frames F7, F8 and F9 are similarly displayed.

In time T13, the reference frame F6, now being available at the control center, is decompressed, and furthermore, the intermediate frame F10 (F10=G10*G6(F1)) is calculated.

In time T14, the intermediate frame F10 is displayed, while at the same time F11=G11(F6) is calculated. It should be noted that, although the reference frame F6 is now available at the control center for display, it is still not displayed as it is an "old" frame containing the point of view of time slice T6, while the already displayed frame F9 is shown from a newer perspective, of time slice T9. For that reason, F10 is displayed, and the frame F11 is prepared at this stage.

In times T15, T16, and T17, the frames F11, F12, and F13, which are based on the information of F6, moved correspondingly to the points of views F11, F12, and F13 are displayed.

In time T18, the operation is similar to that of time T13.

It should be noted that the embodiment of FIG. 4b is advantageous with respect to the embodiment of FIG. 4a, in that the perspective is more updated. More particularly, for example, while in the embodiment of FIG. 4a the perspective of F6 is displayed only when the reference frame F6 is available for display, i.e., in time T14, in the embodiment of FIG. 4b, the perspective of F6 is displayed in time T10. However, while in the embodiment of FIG. 4a all the reference frames, when displayed, are clear of blank areas, the frames of the embodiment of FIG. 4b may include blank areas, as all the frames which are displayed are frames on which a GMF is applied.

The object of the embodiment of FIG. 4c is to display frames that contain minimum blank areas, although the delay in displaying them is considerable.

In the Embodiment of FIG. 4c

No frames are displayed at the control center until the first two reference frames, F1 and F6, are available at the control center.

In time T13, the reference frame F1 is already available (it was decompressed in time T8), and the reference frame F6 is decompressed.

In time T14, the reference frame F1 is displayed. Simultaneously, F2 is calculated. F2 is so prepared as to include minimum blank areas. More particularly, F2 is a mixture of two portions: the first is the reference frame F1 brought to the perspective of F2 (i.e., the camera view at time T2) by means of the operation G2(F1), and the second portion is the reference frame F6 brought to the perspective of F2 by means of the operation $G2*G6^{-1}$(F). The said second portion fills most of the blank areas produced in the frame resulting from the first portion.

In time T15, F2 as calculated in T14, is displayed. Simultaneously, F3 is calculated. F3, in similarity to frame F2, is so prepared as to preclude blank areas. More particularly, F3 is again a combination of two portions: the first being the reference frame F1 brought to the perspective of F3 (i.e., the camera view at time T3) by means of the operation G3(F1), and the second portion is the reference frame F6 brought to the perspective of F3 by means of the operation $G3*G6^{-1}$(F6). The said second portion fills the black areas produced in the frame resulting from the said first portion. F3 is displayed in time 16.

F4, and F5, which are correspondingly displayed in times T17 and T18, are prepared and displayed in a similar manner as F2, and F3, but in their corresponding perspectives.

In time T18, the third reference frame F11 is decompressed, and is available at time T19.

In time T19, the reference frame F6 is displayed.

As shown, in the embodiment of FIG. 4c, the displayed frames contain minimum blank areas. Each intermediate frame is a combination of two portions calculated by two separate GMF calculations. It should be noted that preferably one of the two portions is defined as a primary portion. The second portion is calculated only to fill black areas in the first. The primary portion is preferably the one for which the calculated frame portion is closer to a reference frame. More particularly, in the calculation of F5, the portion resulting from G5(F1) is defined as the secondary portion, and the portion resulting from the calculation $G5*G6^{-1}$(F6) is defined as the primary portion, as the calculated frame F5 is closer to the reference frame F6 than to the reference frame F1, and therefore this portion results in smaller blank areas (which are then filled by the secondary portion). The embodiment of FIG. 4c is advantageous in that it contains minimum blank areas. Its drawback is that the delay between the capture of a frame at the vehicle until its display at the control center is the largest of the three embodiments of FIGS. 4a, 4b, and 4c. For example, while in the embodiment of FIG. 4a the frame F6 is displayed in time T14, and in the embodiment of FIG. 4b the frame F6 is displayed in time T10, in the embodiment of FIG. 4c frame F6 is displayed in time T19.

General Notes:

Delays in the System

Three types of lags are included under the term "channel lag", as follows:

a. Transmission media lag between the front end of the transmitter (e.g., antenna) and the front end of the receiver. This kind of lag may be caused by relays, packet switching routing, etc. and is typical to both uplink and downlink.

b. Signal "protection" lag (or "message integrity lag") which is associated with forward error correcting codes and/or spread spectrum techniques. This type of lag is also typical to both uplink and downlink. Since the method disclosed herein treats the first two types of delays in the same way, we refer to this kind of lag as "delivery lag".

c. Compression/decompression lag: If the channel between the remote vehicle and the operator has a narrow bandwidth, the video sequence must be compressed prior to its transmission. An inherent feature of data compression is the lag, which can stem from various reasons, of which the significant ones are:

The delivery of varying bit rate data (compressed video) through constant rate channel requires buffers that are not allowed to overflow or underflow, at both ends of the channel. As known to the skilled person, a compressed video signal has large variations of bit rate (between frames, dependent on the type I, P or B, and within the frames depending on the visual activity spatial distribution), and hence, substantial buffering is required.

Compression of the B frames requires a "future" frame. Thus, when B frames are used, the compressor has to wait until the next P or I frame is compressed before the intermediate B frames are compressed. This type of delay is typical only of the downlink (that uses MPEG or MPEG-like compression method).

In addition, there can also be an operator delay due to the time it takes the operator to examine a frame and issue a control command.

The induced lag instability in the vehicle's control loop may be viewed as comprising two sub-problems:

Uplink lag: The available frame for display at the operator site is not an up-to-date frame, but a lagged one. Hence, the steering operations carried out by the operator are based on lagged information, which is a situation prone to instability.

Downlink lag: Control commands are interpreted at the vehicle site when the vehicle is no longer at the position referred to by these commands.

Region of Interest Mode of Operation

In a constant channel bit rate reducing the frame size increases the video quality and/or the frame rate. In a preferred embodiment of the invention, the frame size is not fixed but selectable by the operator. In very low bandwidth conditions, the operator may prefer to receive only a portion of the field of view of the camera, but at higher quality and/or higher refresh rate (that is, fewer skipped frames). This may be known as an ROI (Region of Interest) operation.

The Effect of the Segment Size

The number of frames of a segment affects the performance of a system for guiding a remote vehicle. For example, as mentioned above, only reference frames are real captured images, while the intermediate frames are actually transformations of the reference frames. Thus, an object that enters the camera's frame after the reference frame, and disappears before the next reference frame, cannot be seen by the operator. One of the options to decrease the probability of such a situation is to decrease the number of frames of a segment. However, this solution will cause additional lag, since more data must be transmitted.

The invention claimed is:

1. A method for guiding from a remote control center a vehicle (10) towards a target object, said remote control center communicating with the vehicle by a lagged communication channel comprising:

Periodically capturing frame images by a camera on the vehicle, assigning to each of said captured frames an associated unique time stamp, and saving full frame data or partial frame data of captured frames and their associated time stamps within a storage at the vehicle;

For a plurality of frames saved at the vehicle, sending to the control center via the lagged communication channel full frame data, partial frame data or a combination thereof with the corresponding associated time stamp for each sent frame so that an approximate version or an exact version of the sent frames can be reconstructed and displayed at the control center;

Receiving said frame data and associated time stamps at the remote control center, sequentially reconstructing frame images from each said sent fill and/or partial frame data, and displaying the reconstructed images on a display;

Upon marking by an operator at the control center a point on a specific displayed frame, sending coordinates indication relating to said marked point as appearing on said specific frame or on a reference frame available at the control center, and the time stamp associated with said specific frame or said reference frame to the vehicle;

Receiving said coordinates indication as marked and the sent frame time stamp;

Given the coordinates indication and frame time stamp as received, locating said point or object coordinates on a previously saved corresponding frame having a same time stamp, and using an image processing procedure, tracing at a rate higher than said periodical frame capturing said point or object coordinates from said frame towards the most recently available captured frame to find the coordinates of the same point or object as appearing in the most recently available captured frame; and Providing the coordinates of the target point or object within the most recently available captured frame, as found, to an inner guidance sub-system of the vehicle, for enabling the vehicle to track said object.

2. A method according to claim 1, wherein each partial frame data represents an intermediate frame and each full frame data represents a reference frame.

3. A method according to claim 2 wherein at least one intermediate frame is produced between any two reference frames.

4. A method according to claim 2, wherein each partial frame data comprises a set of Global Motion Parameters indicating the global change of a given frame with respect to a previous reference frame, as calculated using a Global Motion Function.

5. A method according to claim 4 wherein a same Global Motion Function is used at the vehicle and at the control center.

6. A method according to claim 5 wherein each reference frame is displayed after being decompressed at the control center.

7. A method according to claim 5 wherein each intermediate frame is displayed at the control center after activating a Global Motion Function, using the Global Motion Parameters of same frame, as received, and data relating to a previous reference frame.

8. A method according to claim 7, wherein, when the operator marks a target on a displayed intermediate frame, the method further comprising backward activating a Global Motion Function to convert the marked coordinates to coordinates on a previous reference frame, before performing the tracing at the vehicle.

9. A method according to claim 8, wherein the activation of the backward Global Motion Function is carried out at the vehicle.

10. A method according to claim 8, wherein the activation of the backward Global Motion Function is carried out at the control center.

11. A method according to claim 8, wherein the tracing of the object coordinates from the reference frame towards the most recently available captured frame is carried out by cascade activating a Global Motion Function at the vehicle, staring from the object coordinates on a reference frame and applying the function on all newer saved frame Global Motion Parameters until determining said target coordinates to target coordinates on the most recently captured frame.

12. A method according to claim 4, for guiding the vehicle towards a static target, wherein only Global Motion Parameters of intermediate frames are saved at the vehicle.

13. A method according to claim 4, wherein the vehicle is guided towards a dynamic target, and wherein full data frames are saved at the vehicle.

14. A method according to claim 13, wherein the tracing of the object coordinates from the reference frame towards the most recently available captured frame is carried out by activating at a rate higher than said periodic frame capturing an object tracing utility at the vehicle, starting from the target coordinates on a reference frame and applying the utility on all newer saved frames until determining the coordinates of the target on the most recently captured frame.

15. A method according to claim 14, wherein the object tracing utility at the vehicle first identifies the marked object region on a reference frame by the coordinates as provided from the control center, and then uses correlation for determining the region movement in all newer saved frames until determining the coordinates of the target, being within said region, on the most recently captured frame.

16. A method according to claim 2, wherein reference frames are compressed at the vehicle before being sent to the control center, and decompressed at the control center.

17. A method according to claim 16 wherein at least one set of Global Motion Parameters is sent to the control center between any two compressed reference frames.

18. A method according to claim 1 wherein the inner guidance sub-system is a system capable of tracking an object to a point to a certain direction, or a combination thereof by a navigation sub-system, a tracker sub-system or a combination thereof.

19. A method according to claim 1 wherein the full frame data representing a reference frame comprises pixel representation data of the frame.

20. A method according to claim 19 wherein the full frame data further comprises at least one set of Global Motion Parameters indicating global change of the reference frame with respect to a previous reference frame.

21. A method according to claim 20 wherein the reference frame is reconstructed and displayed at the control center by either using said pixel representation data or by substituting one of said set of Global Motion Parameters indicating the global change of the reference frame with respect to a previous reference frame in a Global Motion Function.

22. A method according to claim 19 wherein the reference frame is reconstructed and displayed at the control center by using said pixel representation data.

23. A method according to claim 1 wherein the operator is a computerized system.

24. A method according to claim 1, wherein a Global Motion Parameters are used to construct frames as soon as the Global Motion Parameters arrive at the control center, to produce frames with minimum delay.

25. A method according to claim 1, wherein a reconstruction of a frame is based on more than one reference frame.

* * * * *